US012448260B2

(12) United States Patent
Iotti

(10) Patent No.: US 12,448,260 B2
(45) Date of Patent: Oct. 21, 2025

(54) QUICK COUPLING WITH IMPROVED VISIBILITY

(71) Applicant: MANITOU ITALIA S.R.L., Castelfranco Emilia (IT)

(72) Inventor: Marco Iotti, Reggio Emilia (IT)

(73) Assignee: MANITOU ITALIA S.R.L., Castelfranco Emilia (IT)

( * ) Notice: Subject to any disclaimer, the term of this patent is extended or adjusted under 35 U.S.C. 154(b) by 966 days.

(21) Appl. No.: 17/546,856

(22) Filed: Dec. 9, 2021

(65) Prior Publication Data

US 2022/0194764 A1 Jun. 23, 2022

(30) Foreign Application Priority Data

Dec. 21, 2020 (IT) ........................ 102020000031643

(51) Int. Cl.
*B66F 9/065* (2006.01)
*B66C 23/68* (2006.01)
*B66F 9/16* (2006.01)

(52) U.S. Cl.
CPC ............ *B66F 9/0655* (2013.01); *B66C 23/68* (2013.01); *B66F 9/16* (2013.01)

(58) Field of Classification Search
CPC ................................. B66F 9/16; B66F 9/0655
See application file for complete search history.

(56) References Cited

U.S. PATENT DOCUMENTS

| | | | | | |
|---|---|---|---|---|---|
| 4,545,720 | A * | 10/1985 | Cochran | E02F 3/3627 | 172/275 |
| 6,364,561 | B1 * | 4/2002 | Droegemueller | E02F 3/967 | 403/336 |
| 7,112,032 | B2 * | 9/2006 | Gokita | E02F 3/286 | 37/468 |
| 9,039,343 | B2 * | 5/2015 | Nishi | E02F 9/264 | 414/698 |
| 9,284,712 | B2 * | 3/2016 | Bradley | E02F 3/3631 | |
| 9,783,962 | B1 * | 10/2017 | Hitchcock | E02F 3/3417 | |
| 2005/0254931 | A1 | 11/2005 | Gokita | | |

FOREIGN PATENT DOCUMENTS

| | | | | |
|---|---|---|---|---|
| CN | 206858073 | U | * | 1/2018 |
| EP | 1577256 | A1 | | 9/2005 |
| JP | 55151796 | U | * | 11/1980 |
| JP | S55151796 | A | | 11/1980 |
| JP | 07172793 | A | * | 7/1995 |
| JP | H07172793 | | | 7/1995 |

* cited by examiner

*Primary Examiner* — Gerald McClain
(74) *Attorney, Agent, or Firm* — Chrisman Gallo Tochtrop LLC

(57) ABSTRACT

Described is an attachment device (1) for telehandlers (100) designed to be connected to an operating arm (101) and comprising a front frame (12) designed for removably attaching an accessory (102) for engaging a load, such as a fork, a side shift carriage, a winch or a loading platform. The frame comprises two lateral sides (121) and two crosspieces (122), of which one upper and one lower, which join the side elements (121) to each other.
One or more crosspieces (122) have an oblique inner side (120) relative to a horizontal plane.

7 Claims, 8 Drawing Sheets

QUICK COUPLING WITH IMPROVED VISIBILITY

This invention relates to an improved quick coupling, with increased operational visibility, designed for use on telescopic handlers or "telehandlers".

Accessories are known in the prior art which are designed to be mounted on the telescopic operating arm of telehandlers in order to move loads.

Amongst the most common accessories there are forks, side transfer units, winches, loading platforms, jib arms, etc.

These accessories may be attached in a removable fashion to an attachment device with which the operating arm is provided.

More specifically, the attachment device, commonly known as "quick coupling", can be mounted in a removable fashion or directly at the distal end of the operating arm.

A prior art quick coupling A includes two main components: a central and rear attachment structure S, which is the part mounted on the arm and a front frame T, which is the part to which the accessory is attached.

More in detail, as shown in FIGS. 1 and 2, according to the prior art solution, the front frame T comprises a frame structure formed by two lateral plates P and two tubular crosspieces O with a quadrangular or circular cross-section, fixed above and below the central and rear structure S, which join the plates P to each other. The plates P form upper hooks and are equipped with lower holes which are used for the removable attachment of the accessory.

Although this solution is currently used in practice, it has some limitations which, in certain circumstances, make it difficult to use and which will be explained below, making reference to the example wherein the accessory used is a fork, even though what is said also applies for other accessories. In order to be able to correctly insert forks in a load which is rested on the ground, the operator U of the telehandler needs to clearly see the load and how the tips of the prongs of the forks are positioned relative to the load, so as to insert them in the correct manner in the base pallet.

However, the prior art quick couplings A constitute an obstacle for the vision of the operator which is limited to the inner free squares defined by the two crosspieces O, the central structure and the side walls P (see FIGS. 3 and 4).

More in detail, since the cab is mounted in the telehandlers alongside the operating arm, in the majority of cases on its left, and is therefore off centre relative to the attachment A, the view V of the operator U is usually facing the left-hand free box.

More in detail, what has a greater affect on the reduction of the vision is the shape of the two crosspieces O, which, however, cannot be slimmed excessively to prevent them from falling under the weight of the considerable loads raised.

The configuration of the prior art coupling A sometimes forces the operator U to perform some operations, in preparation for inserting the forks in the load, for inclining and moving the accessory to have an adequate idea of the mutual arrangement between the tips of the prongs of the forks and the pallet at the base of the load.

These manoeuvres are inconvenient and the need is therefore felt in the market for a telehandler apparatus with improved visibility which overcomes the limits of the prior art.

The technical purpose which forms the basis of the invention is to provide a quick coupling for telehandlers which satisfies the above-mentioned need.

The specified technical purpose is achieved by the attachment device for telehandlers made according to the appended claims.

Further features and advantages of the present invention are more apparent in the non-limiting description of a preferred embodiment of the quick coupling, as illustrated in the accompanying drawings, in which.

Figure 2:
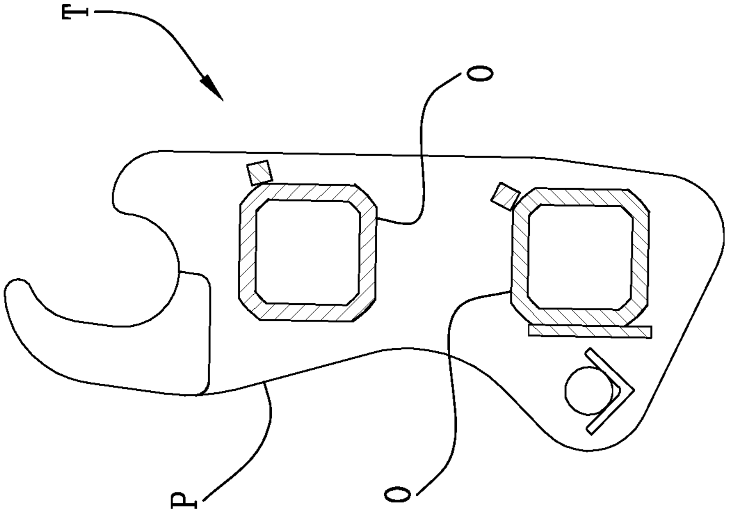
Fig.2 PRIOR ART
FIG. 2 is a transversal and vertical cross section of the front frame of the quick coupling of FIG. 1.
Figure 1:
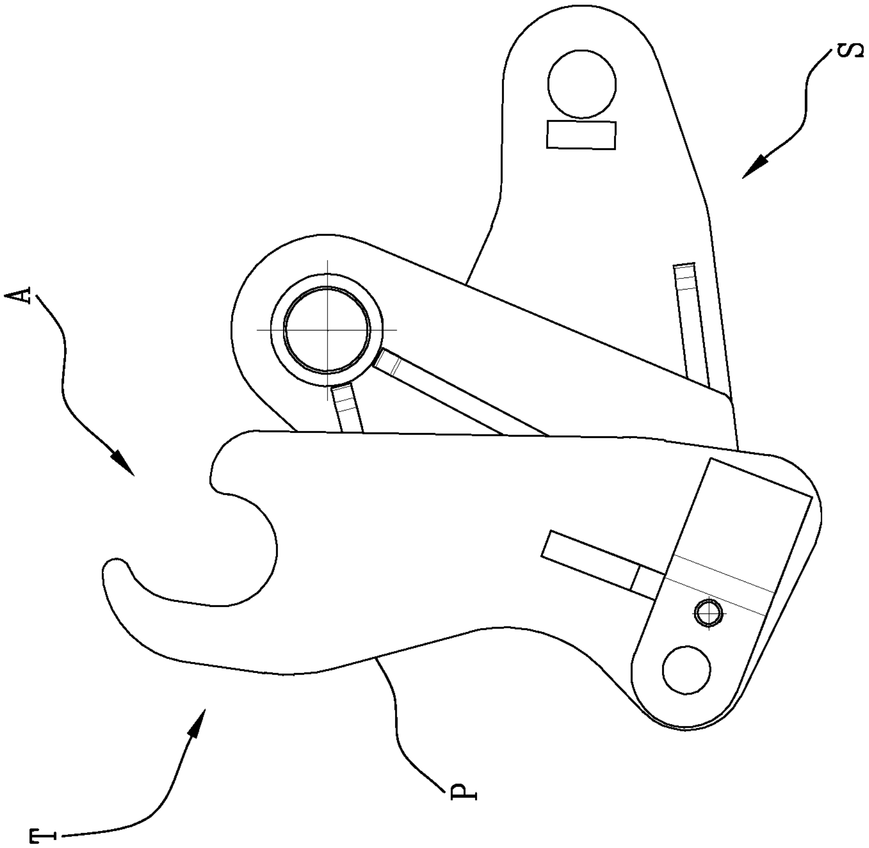
Fig.1 PRIOR ART
FIG. 1 is a side view of a quick coupling according to the prior art.

With reference to the accompanying drawings, the numeral 1 denotes in its entirety an attachment device, or "quick coupling", for telehandlers 100, made according to the invention.

The device 1 proposed is designed to be connected in a removable fashion to an operating arm 101 of the telehandler 100 and comprises a front frame 12 which is designed for removably attaching an accessory 102 for engaging the load, such as a fork, a side shift carriage, a winch, a loading platform or others, to which reference is made in the introduction.

Moreover, the device 1 comprises a central and rear attachment structure 11, which is the part which is mounted on the arm 101.

Figure 7:
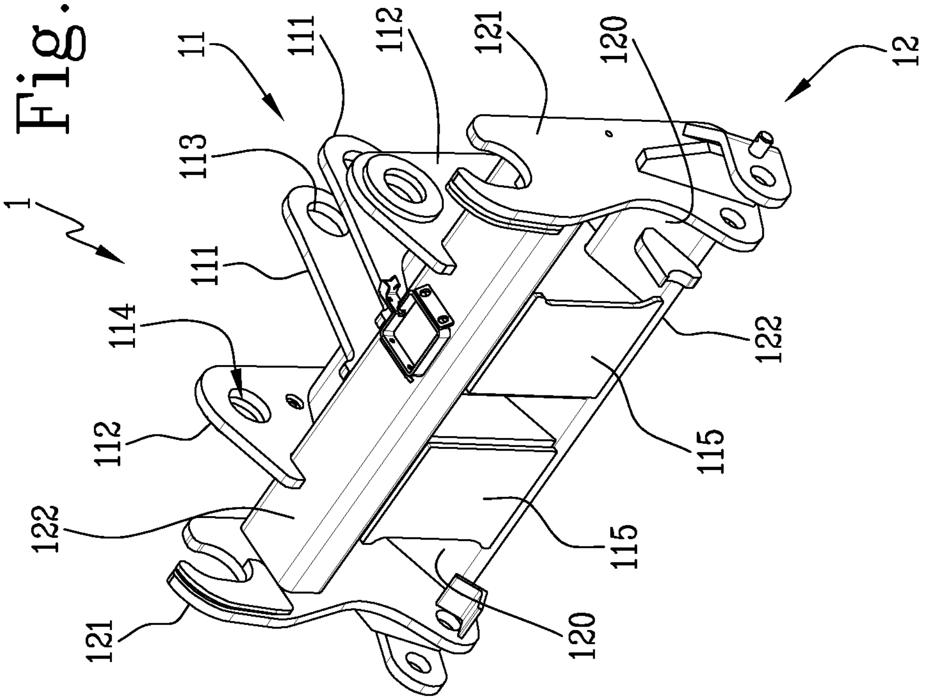
FIGS. 6 and 7 are axonometric views, seen from different points of view, of the attachment device according to the invention.
Figure 6:
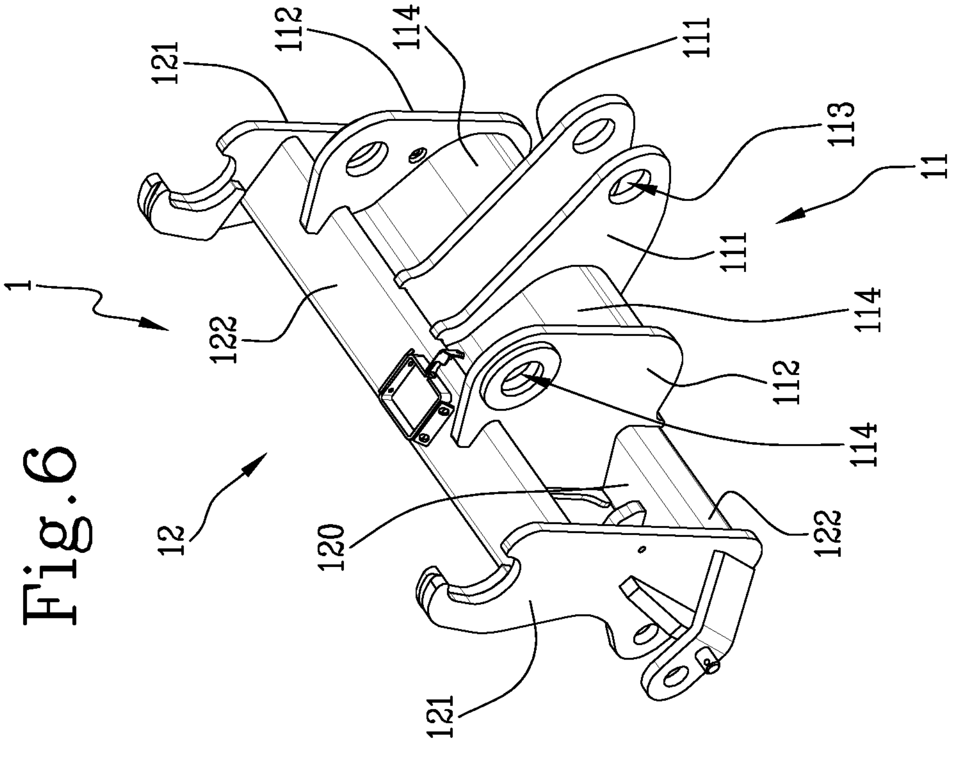
Figure 9:
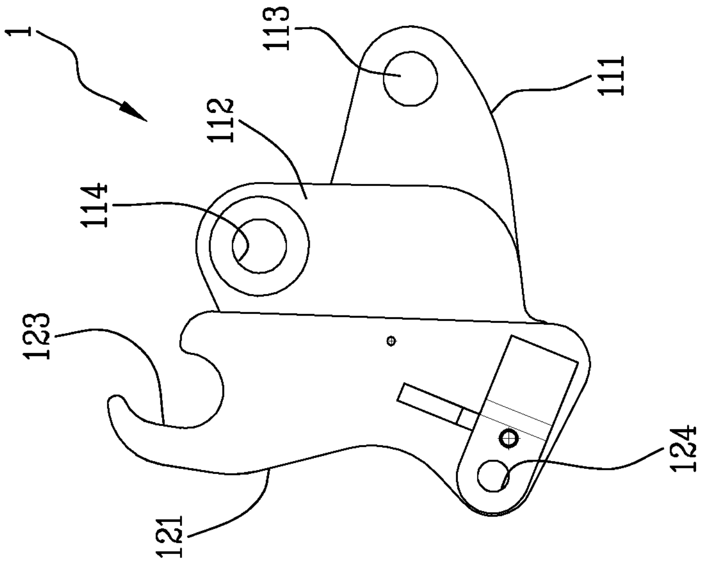
FIGS. 8 and 9 are, respectively, a front view and a side view of the device according to the two previous drawings.
Figure 8:
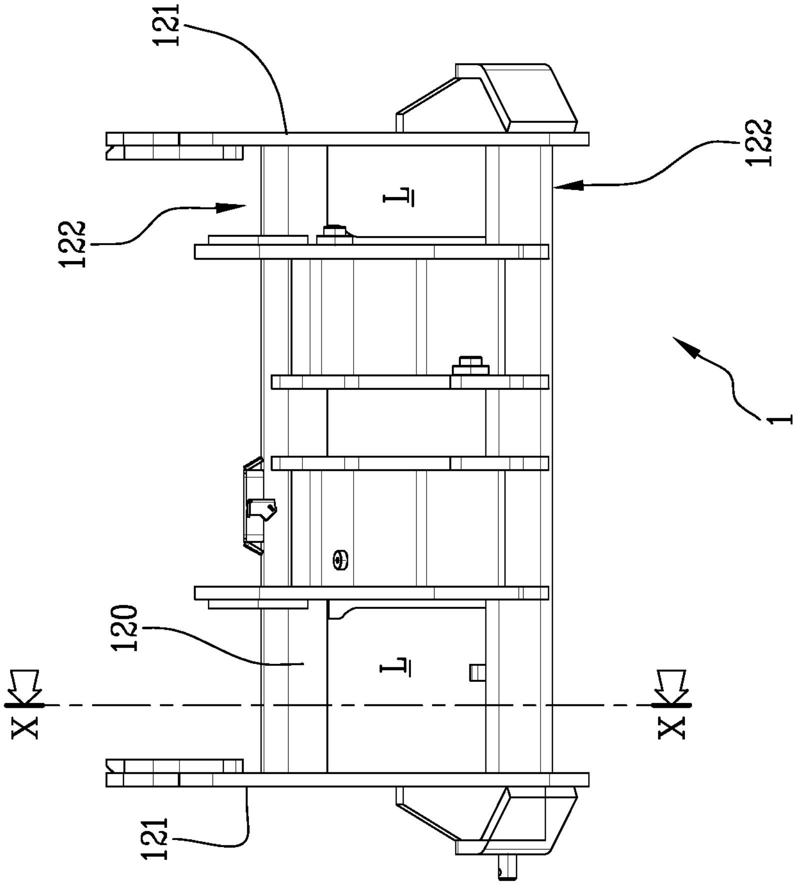

More in detail, as shown in FIGS. 6, 7 and 9, the central structure 11 may include two opposite flanges 111, 112 which extend to the rear, each of which is equipped with a through hole 113, 114 for inserting a pin for attachment to the distal end of the operating arm 101.

More specifically, two pairs of flanges 111, 112, preferably positioned on planes parallel to each other, can be provided, equipped with respective through holes 113, 114, the first pair being designed to connect, as a possibility of rotation, to the above-mentioned end of the arm 101 and the second pair being provided for the attachment of an end of the hydraulic tilting cylinder (not illustrated), the other end of which is connected to the arm 101. In practice, a pair of flanges 112, preferably external, comprises two holes 114 positioned at the top for the attachment to the arm 103 and the other pair of flanges 111, preferably internal, comprises two through holes 113 positioned centrally, for the purpose of the attachment to the end of the arm of the tilting cylinder.

Each flange 111, 112 of one pair may be joined to a respective flange of the other pair by lateral walls and/or front reinforcement walls 115, to form box-shaped structures.

With reference to the above-mentioned front frame 12, this includes two opposite lateral side elements 121, which act in practice as uprights, which may consist of lateral plates 121 and which are joined together by two opposite crosspieces 122 of which one upper and one lower, to define a frame-like configuration (see FIGS. 6-10).

The two crosspieces 122 are fixed above and below one or more front portions of the above-mentioned central structure 11, so that the latter is rigidly joined to the frame 12. Preferably, the central structure 11 is located in a median position between the two lateral side elements 121 and, in the example illustrated, its front portion closed in the form of a "sandwich" by the crosspieces 122 is defined by the above-mentioned box-shaped structures, which include the two front reinforcements 115.

Each of the lateral side elements 121 forms a hook-shaped seat 123 and a lower through hole 124 is made in each of them, to allow the removable attachment of the accessory 102; more precisely, a bar of the accessory 102 is received by the two hook-shaped seats 123, parallel and facing each other, whilst a pin is inserted between the two lower holes 124 aligned with the lateral side elements 121 and respective holes or slots of the accessory 102, to allow the removable attachment to the device 1.

Figure 10:
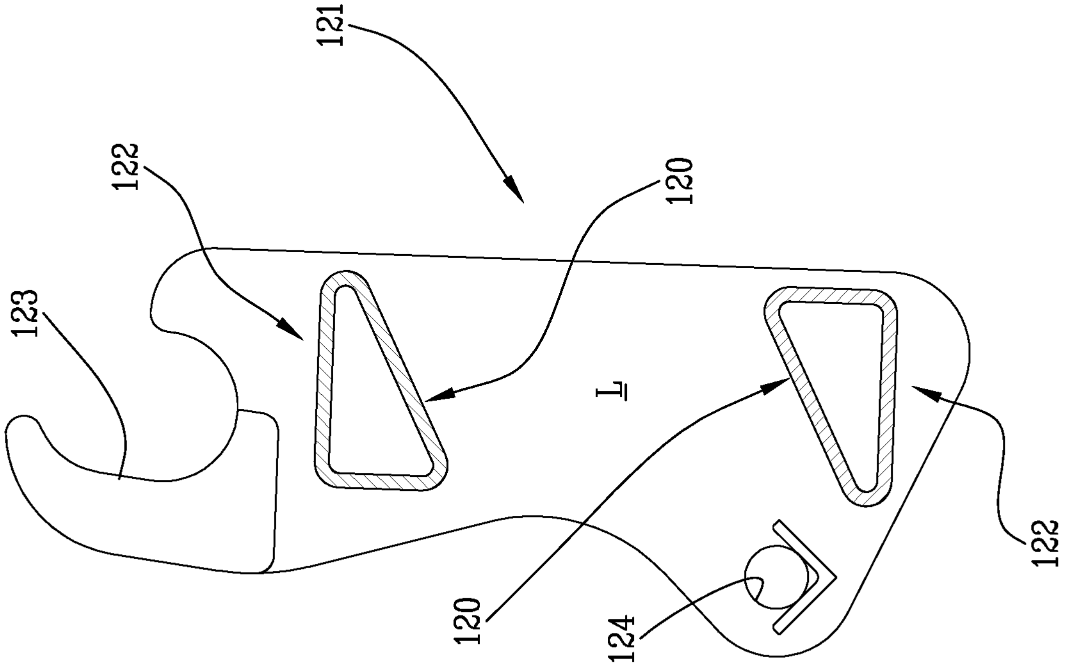
FIG. 10 is a transversal cross section of FIG. 8 along the plane X-X.

According to an important aspect of the invention, shown clearly in FIG. 10, the two crosspieces 122 are each equipped with an inner side 120 which is oblique relative to a horizontal plane; preferably the oblique sides 120 of the crosspieces 122 are parallel to each other.

The term "inner side" 120 is used here to mean a side of the profile of the respective crosspiece 122 which faces towards the inside of the attachment device 1; in general, a fast coupling 1 can also be provided wherein at least one of the two crosspieces 122 is provided with the oblique inner side 129.

It should be noted how these oblique inner sides 120 form with the inner sides of the lateral side elements 112 two free passages L, that is to say, spaces circumscribed on the perimeter of the lateral side elements 121 and the crosspieces 122, which will be described in more detail below (see FIGS. 8, 11, 12 and 14).

According to an advantageous aspect of the invention, the oblique inner sides 120 of the two crosspieces 122 are inclined downwards in a front direction; the front direction is defined by the fact that the attachment device 1 mounts the accessory 102 at the front whilst at the rear it is connected to the arm 101.

In general, when the terms "front", "frontal", "forward", "rear", "upper", "lower", "side", "vertical" or "horizontal" are used in this description, in relation to the device 1 according to the invention, in its entirety or with regard to its components, reference is made to how it is positioned in space during its use, that is to say, when it is connected to the operating arm 101 of the telehandler 100.

For this reason, the inner sides 120 of the crosspieces 122 are oblique to a horizontal plane, when the attachment device 1 is used on a telehandler 100 which is on horizontal ground; on the other hand, the horizontal plane in question is in reality a plane parallel to the ground or defined by the points for resting on the ground of the telehandler 100, whether it rests on the wheels or on the stabilizers; another way to express the same concept is that the inner sides 120 of the crosspieces 122 are oblique relative to a direction incident with and parallel to the longitudinal axis of the machine or the turret of the telehandler 100 (depending on whether it is fixed or rotary), to which the device 1 according to the invention is connected.

The crosspieces 122 are preferably parallel, in the direction of their length and have the oblique inner sides 120 facing each other.

According to the preferred embodiment of the invention, shown in the accompanying drawings, the crosspieces 122 are tubular elements with a triangular cross-section which are identical but oriented in such a way as to be rotated by 180 degrees with respect to each other. However, there may be other embodiments of the inventive concept defined by the claims, wherein the oblique inner sides 120 are defined by crosspieces 122 shaped in a different manner.

In the cases wherein the crosspieces 122 are tubular, the above-mentioned oblique side corresponds to an oblique wall of the respective crosspiece 122.

In still more detail, according to the specific embodiment shown in the drawings, the transversal cross-section of each crosspiece 122 has the shape of a right-angled triangle, with the hypotenuse which constitutes the oblique inner side.

Figure 5:
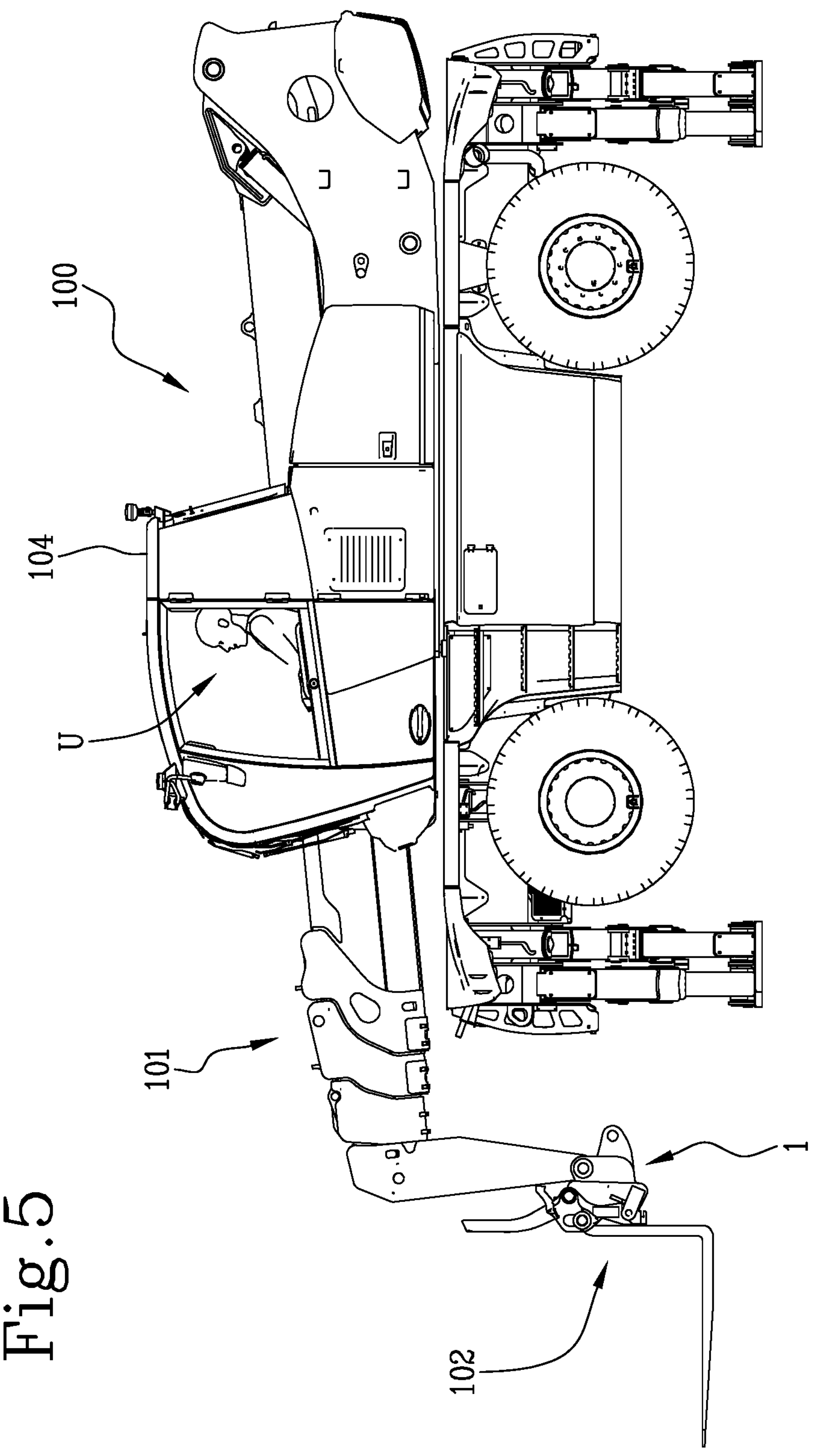
FIG. 5 is a side view of a telehandler which mounts the attachment device according to the invention.
Figures 11, 12:
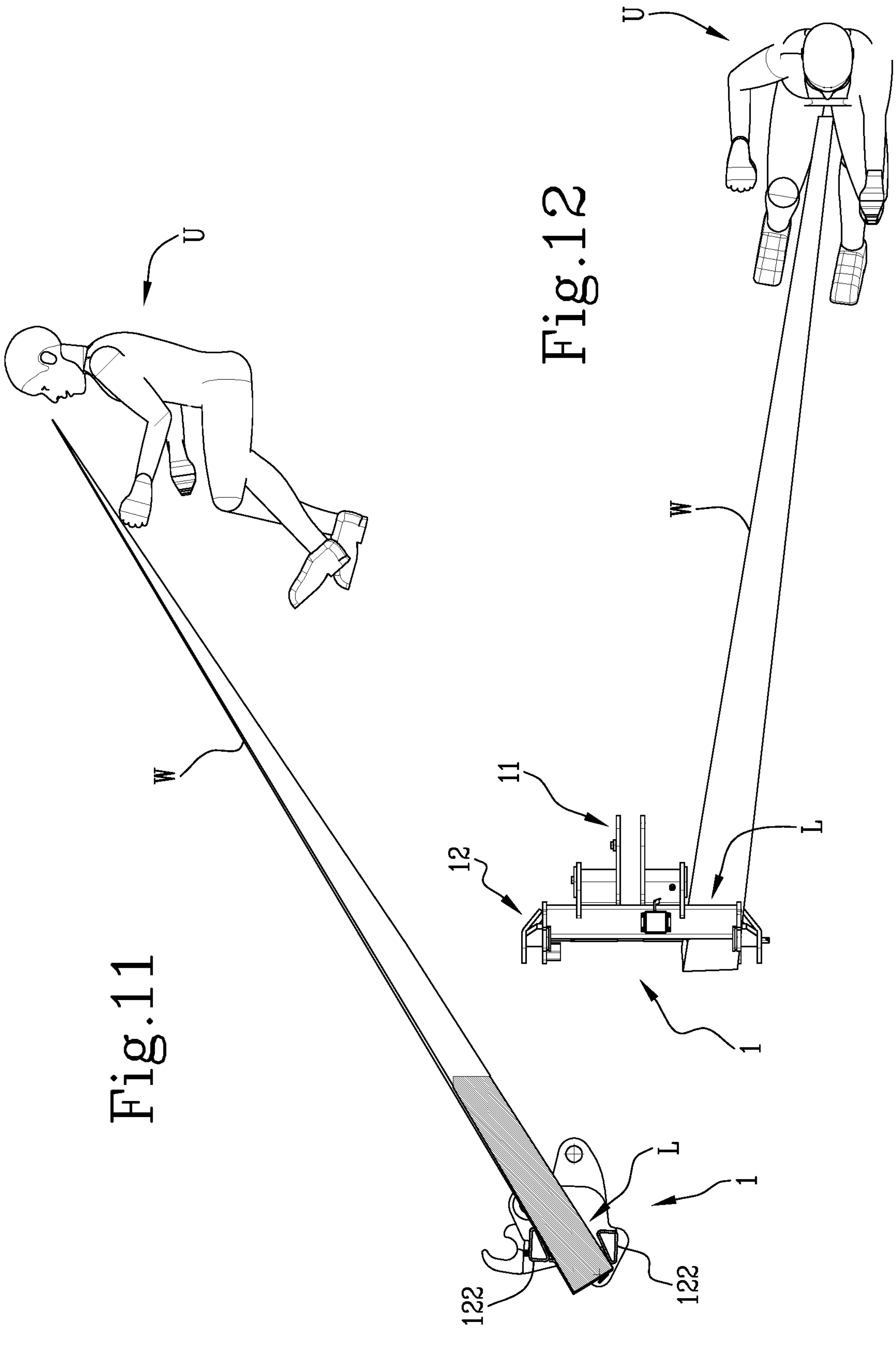
FIGS. 11 and 12 are, respectively, a schematic side view and a schematic top view which show the view of an operator through the device according to the invention.

As may be understood by comparing FIGS. 5, 11 and 12, there is at least one position of use of the proposed attachment device 1, due to how it is moved by the operating arm 101, wherein the direction of the vision W of the operator U positioned in the driver's cab 104 passes freely through one of the above-mentioned free passages L, to allow direct view of the accessory 102.

Preferably, this circumstance occurs in a lowered position of use of the attachment device 1, close to the ground, where the accessory 102 carried by it is in a position for preparing the operation for gripping the load (as in FIG. 5).

Figure 3:
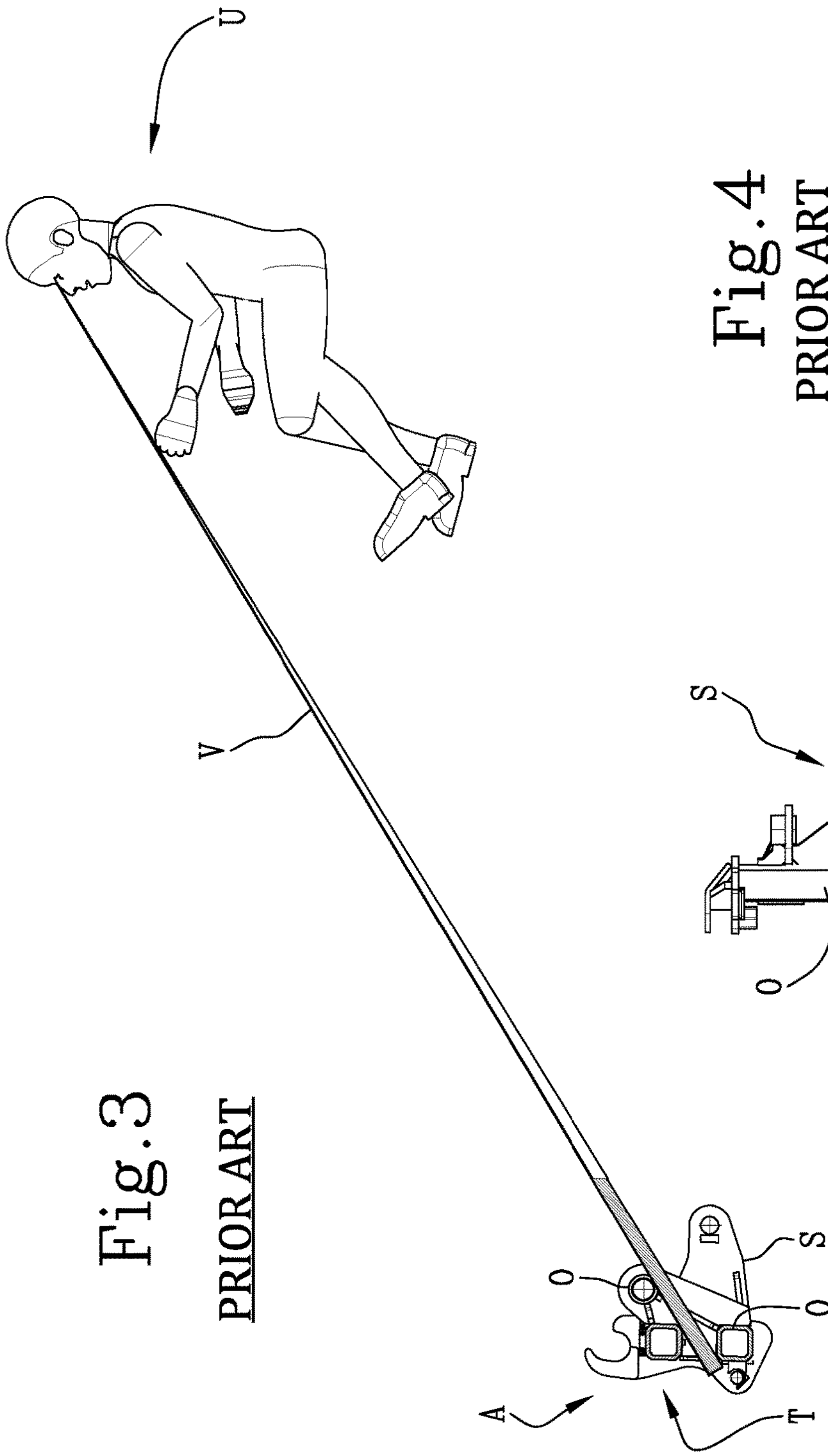
Fig.3 PRIOR ART
FIGS. 3 and 4 are, respectively, a schematic side view and a schematic top view which show the view of an operator through the quick coupling according to the prior art.
Figure 4:
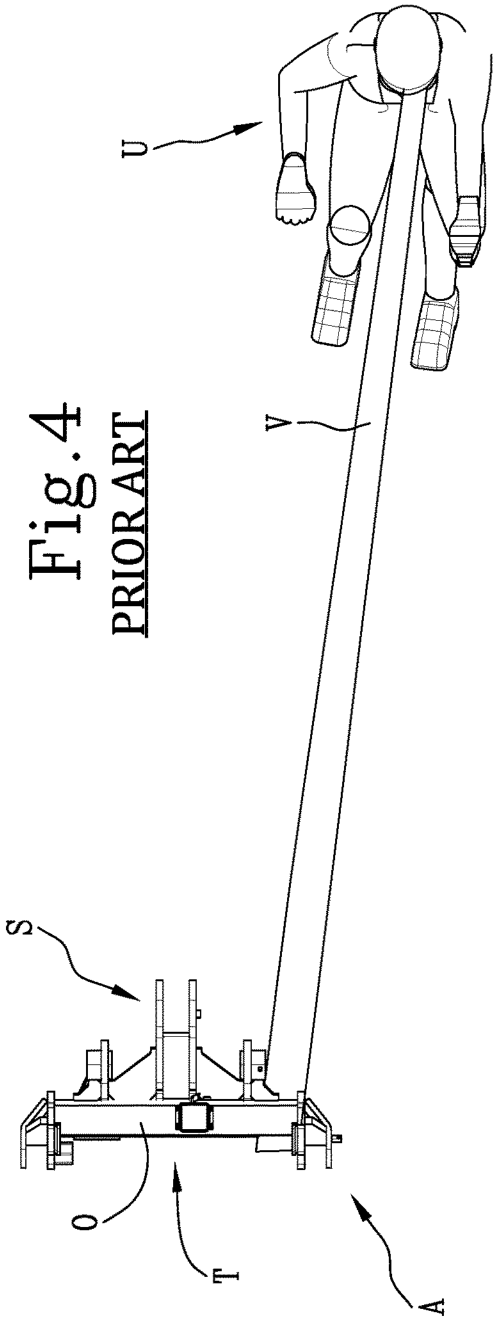
Fig.4 PRIOR ART
Figure 14:
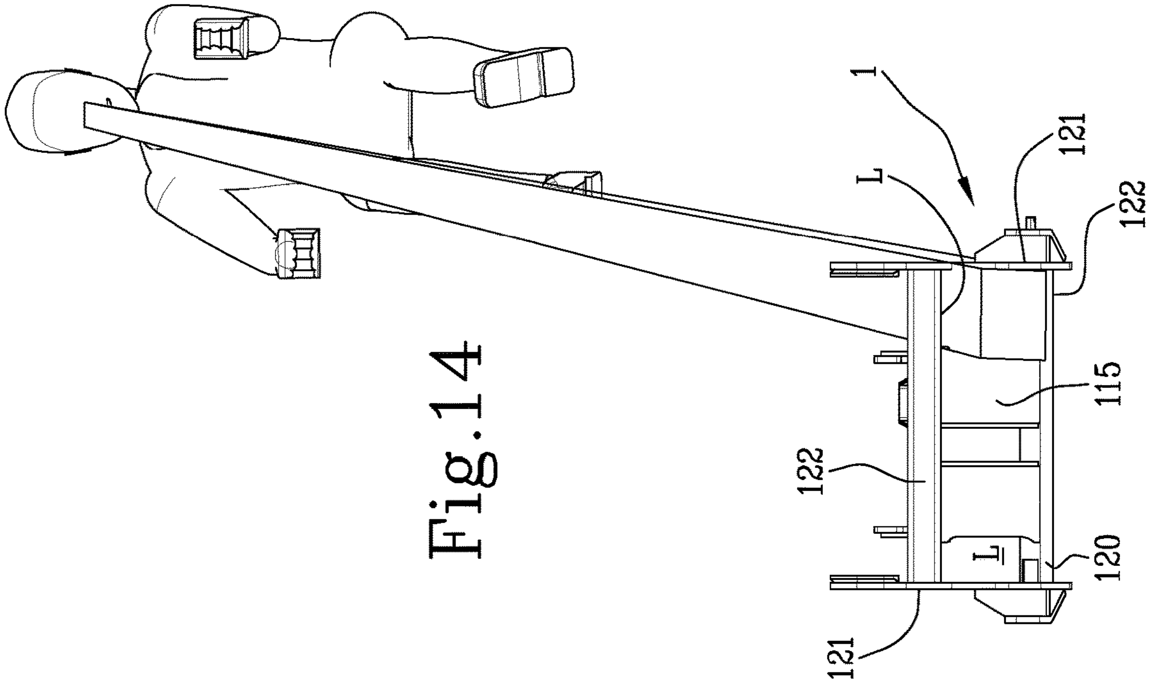
FIGS. 13 and 14 are schematic front views showing the view of an operator through, respectively, the quick coupling of the prior art and the attachment device according to the invention.
Figure 13:
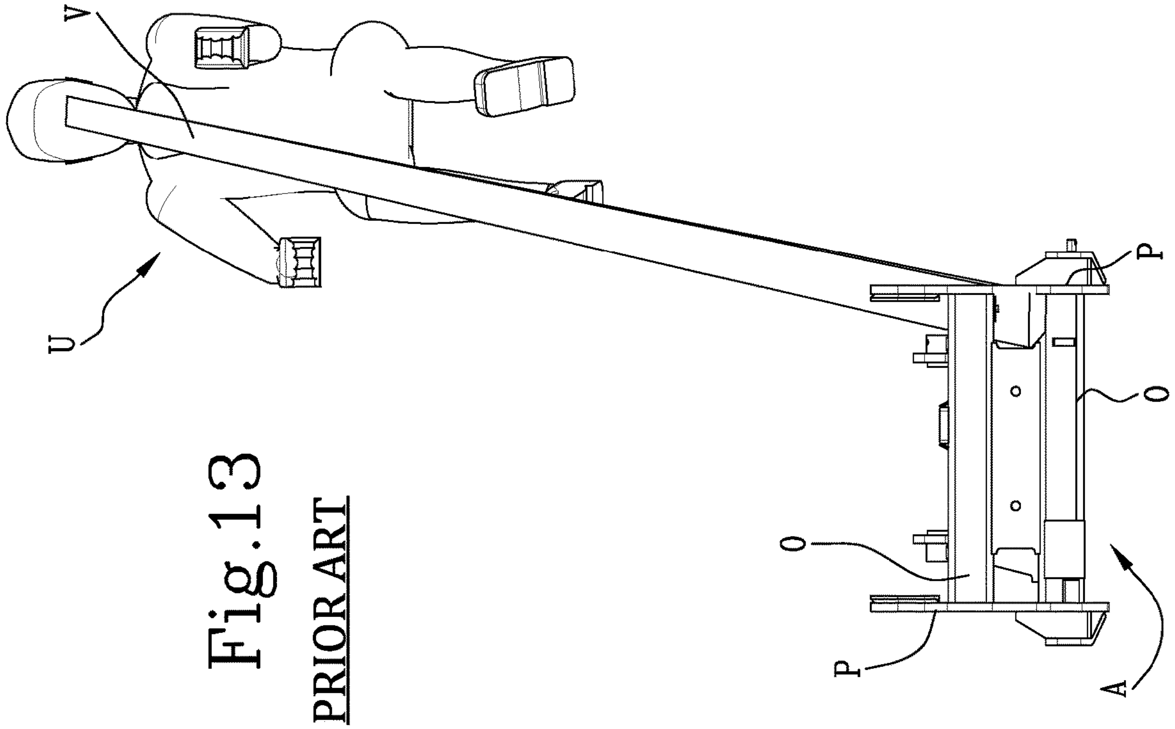
Fig.13 PRIOR ART

Comparing FIGS. 3 and 4 with FIGS. 11 and 12 and comparing FIGS. 13 and 14 to each other it may be understood how the configuration with oblique inner sides 120 of the crosspieces 122 according to the invention exceeds the limits of the prior art, which adopts a configuration with horizontal inner sides.

In effect, when the fast coupling according to the invention is used, the direction of the vision W of the operator U, seated in the driving position, which passes through the free passages L defined between the lateral side elements 121 and the crosspieces 122, is not obstructed or is in any case obstructed less by the overall dimensions of the crosspieces 122, compared with what occurs when a prior art fast coupling A is used.

In effect, the prior art quick couplings A have crosspieces 122 with a square or circular cross-section with inner protruding walls, which form corners or arcs of a circle, which constitute obstacles which limit the vision W of the operator. Thanks to the configuration with oblique inner sides 120, on the other hand, the invention eliminates these corners, to allow the operator U to have a much greater visibility W, thereby overcoming the drawbacks described in the introduction.

Lastly, since the cab 104 is mounted alongside the operating arm 101, the width of the free passage L defined in the quick coupling 1 according to the invention passing through which the operators view W passes may be greater than the width of the opposite passage L, which is not affected by the view W.

In other words, if the cab 104 is located on the left of the arm 101, the distance between the left lateral side element 121 and the left box-shaped structure 114 is greater than that between the corresponding components on the right, to allow a view W which is even greater for the operator U.

The invention claimed is:

1. An attachment device (1) for a telehandler (100) designed to be connected to an operating arm (101) of the telehandler (100) and comprising a front frame (12) designed for removably attaching an accessory (102) for engaging a load, such as a fork, a side shift carriage, a winch or a loading platform, wherein said frame comprises two lateral side elements (121) and two crosspieces (122), of which one upper and one lower, which join the side elements (121) to each other, said crosspieces (122) having an inner side (120) oblique relative to a horizontal plane and inclined downwards in a front direction, wherein both of the crosspieces (122) have a triangular cross-section and wherein the shape of the cross-section of a crosspiece (122) is obtained by a rotation of 180° of the shape of the other crosspiece (122).

2. The device (1) according to claim 1, wherein both the crosspieces (122) have oblique inner sides (120).

3. The device (1) according to claim 2, wherein the oblique inner sides (120) form with inner sides (120) of said lateral side elements (121) one or more free passages (L).

4. The device (1) according to claim 3, wherein the inner sides (120) of the two crosspieces (122) are parallel to each other.

5. The device (1) according to claim 4, wherein the triangular cross-section is that of a right-angled triangle and that said oblique inner side (120) constitutes the hypotenuse.

6. A telehandler (100) whose operating arm (101) is connected to an attachment device (1) according to claim 1.

7. The telehandler (100) according to claim 6, wherein both the crosspieces (122) have oblique inner sides (120);

wherein the oblique inner sides (120) form with inner sides (120) of said lateral side elements (121) one or more free passages (L);

the telehandler (100) being equipped with a driving position for an operator (U), wherein in one or more positions of use of the attachment device (1) which can be moved by the operating arm (101), the direction of view (W) of the operator (U) who is in said driving position freely passes through said free passage (L).

* * * * *